United States Patent

[11] 3,630,812

[72] Inventors: Fritz Bruckner; Hans Krings; Hans Peter Siemonsen; Franz Kramling, all of Aachen, Germany
[21] Appl. No.: 794,152
[22] Filed: Jan. 27, 1969
[45] Patented: Dec. 28, 1971
[73] Assignee: Compagnie de Saint-Gobain Neuilly-sur-Seine, France
[32] Priorities: Jan. 29, 1968, Feb. 7, 1968
[33] Germany
[31] P 16 80 001.4, P 16 96 051.3

[54] WINDSHIELD FOR MOTOR VEHICLES
6 Claims, 4 Drawing Figs.
[52] U.S. Cl. ............... 161/139, 161/44, 161/117, 161/118, 161/125, 161/145, 161/149, 161/183, 161/199, 161/227, 161/231, 161/256
[51] Int. Cl. ............... B32b 3/06, B32b 17/10
[50] Field of Search ............... 161/38, 39, 40, 44, 113, 114, 149, 145, 199, 192, 117, 118; 296/84; 156/101; 52/203, 208

[56] References Cited
UNITED STATES PATENTS

| | | | |
|---|---|---|---|
| 2,679,467 | 5/1954 | Sherts | 156/101 |
| 2,808,355 | 10/1957 | Christie et al. | 164/44 |
| 3,081,209 | 3/1963 | Chan et al. | 161/1 |
| 3,169,900 | 2/1965 | Ermlich | 161/149 |
| 3,375,626 | 4/1968 | Grotefeld et al. | 52/208 |
| 3,427,770 | 2/1969 | Kunert et al. | 296/84 |
| 3,434,915 | 3/1969 | Garrison | 161/199 |

Primary Examiner—John T. Goolkasian
Assistant Examiner—D. J. Fritsch
Attorney—Bauer and Seymour ABSTRACT: Windshields are constructed on a basis of the tolerance of the human body to impact, with special attention to the tolerance of head and spine, macroscopic lesions on the cervical vertibrae and resistance of the brain to cerebral lesions. The designs contemplate a windshield, of unbreaking center and fragile rim, which will transmit the shock of impact and break the rim in the few microseconds before body tolerance to impact has been exceeded. An impact duration of 30 microseconds is treated as the upper limit of toleration within which the windshield must shear off at its edges. Several designs are disclosed based upon special treatments for the center and the rim.

PATENTED DEC 28 1971

3,630,812

INVENTORS
FRITZ BRUCKNER
HANS KRINGS
HANS PETER SIEMONSEN
FRANZ KRÄMLING

BY Bauer and Seymour
ATTORNEYS

WINDSHIELD FOR MOTOR VEHICLES

The invention relates to a windshield for motor vehicles. At present, two types of safety panes are being used for windshields, safety panes comprising a single plate of glass and, panes comprising several plates of glass and frequently referred to as "laminated safety glass." The safety panes constituted by a single plate of glass consist of tempered glass endowed, in its surface layers, with a compression stress held in balance by a tensile stress prevailing in the interior of the glass plate. The standard laminated plate consists of two separate untempered glass plates joined to one another by means of a thermoplastic intermediate layer of polyvinyl butyral.

A safety pane made of a single plate of glass will disintegrate into very small pieces, along its entire area, at the moment of breaking. If, as the result of a sudden deceleration of the vehicle, a passenger is projected against a windshield made of a single pane of safety glass, said glass will break at a rate of impact of the passenger's head of approximately 15 km./hr., as a result of local bending stresses. The fragmentation process spreads very fast. After 1 millisecond following the contact of the head with the windshield the latter is completely shattered and the passenger's head is freed and thus no longer subject to any deceleration forces. As a result of this extremely short action of the deceleration forces, only a small portion of the kinetic energy of the body is absorbed by the windshield.

Safety panes made of laminated glass are traversed starting with certain minimum speeds of impact. In the case of a thickness of the polyvinyl butyral spacer layer of 0.38 mm., in current use, and at an ambient temperature of approximately 20° C., the passenger's head can traverse the windshield provided the speed of impact of the head exceeds approximately 25 to 30 km./hr. Unfortunately, the perforating of the windshield made of laminated glass results in the extremely dangerous formation of the so-called "collar," that is to say, along the periphery of the transpierced zone there appear very sharp glass fragments that are firmly held by the sheet of butyral and may, therefore, easily result in fatal incisions.

To reduce the risk of perforation, it has been proposed to double the thickness of the butyral layer. Such spacer layers of butyral are known in the trade under the name of "High Impact sheets" or "High Penetration Resistance sheets." They are pierced starting at approximately doubled relative impact speeds, i.e., approximately 45 km./hr. If the windshield is not pierced, a fraction by a multiple greater than the kinetic energy of the body is absorbed by such a windshield compared to the one the butyral layer of which has a thickness of only 0.38 mm., namely in the form of a work of deformation in the plastic spacer layer as well as in the human organism.

In other words, when the windshield is not perforated, the fraction of the kinetic energy of the body which is absorbed by such a laminated glass windshield is several times greater compared with one in which the butyral layer is only 0.38 mm. thick, and this takes the form of deformation work, both in the intermediate plastics layer and in the human organism.

Contrary to the windshields consisting of a single sheet of safety glass, with regard to which the duration of the effect of the impact forces is in the order of 1 millisecond, the duration of the effect of the identical forces in the case of laminated panes is incomparably longer due to the plastic deformation of the butyral spacer sheet. In the case of the impact of a human body it may reach 160 msec.

As to the internal injuries resulting upon the impact of a passenger against the windshield, it is now known that, apart from the level of the forces of deceleration, the duration of the effect of these forces is a factor of decisive importance. The longer the duration of the effect of the deceleration forces, the smaller must these forces be in order to be withstood by the organism without any damage.

Different organs of the human body have different levels of resistance (tolerance limits) with respect to deformation stresses and their effective duration. The best known works by experts on head lesions and injuries in the event of an impact of the forehead against a hard plate are attributable to L. M. Patrick, Department of Engineering Mechanics, Wayne State University. These works have been published, among other, in the article entitled "Human Tolerance to Impact—Basis for Safety Design."

In that article, based on the findings of his tests on cerebral shocks of average seriousness, L. M. Patrick established a tolerance curve indicating the effective decelerations allowable with respect to effect duration. The curve in question illustrates quite clearly the great importance of the effect duration of the deceleration forces on cerebral lesions.

It is also known that, in the case of car accidents, fatal lesions occur at the level of the cervical vertebrae which result from the impact of the head against the windshield. Published accident statistics show that, as to the fatal outcome of car accidents, lesions of the cervical vertebrae are attended by far greater risks than skull lesions.

As a result of thorough tests it has now been found that safety panes involving long-duration shocks, i.e., more particularly the known types of laminated safety panes, may result, under specific conditions not excluded in practice, in fatal lesions of the cervical vertebrae even in the case of relatively low impact velocities. It was found, on the other hand, that the tolerance limit for macroscopic lesions of the cervical vertebrae lies substantially below the tolerance limit already referred to above in connection with cerebral shocks (see D. Ziffer, F. Bruckner and R. Henn, "Das Verhalten der Halswirbelsaule in Verbindung mit der Schadelbasis und der oberen Brustwirbelsaule bei Sturzen auf Sicherheitsglas fur Automobilfrontscheiben (Einscheibensicherheitsglas-Verbundsicherheitsglas)," Zentralblatt fur Verkehrmedizin, Verkehrpsychologie und angrenzende Gebiete, Dec. 1967).

Thus, as established by these research works, the cervical vertebrae lesions can be caused by the vertebrae being subjected to a dangerous degree of flexion or fissuring even in the case of comparatively low impact velocities, when a fraction of the mass of the body of approximately 15 kg. is being thrust toward the said vertebrae. Upon the impact of the head against a windshield made of laminated glass plates, the windshield will actually form a trough after the breaking of the glass panes, due to the deformation of the butyral spacer layer in the impact area. As a result, the head is blocked in a stationary position and can no longer move under the thrust of the mass of the body, in such a way that, due to this thrust, there is generated, in addition to dangerous stresses in the cervical vertebra region, a considerable flexural stress on the vertebrae, resulting in the very serious injuries referred to above.

The extent to which the resistance of the cervical vertebrae is below the resistance of the brain to cerebral lesions can be gathered from the numerical data, indicated below, obtained from tests in which the mass thrust in the direction of the cervical vertebrae is 14 kg.: whereas in the case of a stress duration of 50 msec. the tolerance limit with regard to cerebral lesions is, according to L. M. Patrick, approximately 220 kg. effective force, (the data supplied by Patrick in the area of acceleration are expressed in kg.-force by multiplication by taking 4.5 kg. as average skull weight), according to the works by D. Ziffer, on the contrary, in the case of an identical impact duration against a windshield, the vertebrae are seriously injured by a stress of 50 kg. effective force. These values relate to macroscopic lesions on the cervical vertebrae, such as, for instance, a breaking of the intervertebral disks. They are even lower under certain circumstances if one considers the microscopic lesions which may nonetheless be fatal.

Considering the findings of each test taken by itself, one comes to the conclusion that one must, on the whole, fear the occurrence of serious injuries, through a rupturing of the cervical vertebrae, if the impact duration exceeds 30 msec.

It is the object of the invention to take these data into consideration and to provide a safety windshield endowed with improved properties, and which offers greater protection against internal injuries upon the impact of the head against the windshield, by providing a reduction in the duration of the impact.

The windshield according to the invention is characterized by the following points:

a. the windshield edge affixed in the frame of the car body consists exclusively of silicate glass; i.e., ordinary glass of windshield type;
b. the median area of the windshield, that is to say, the entire windshield except the peripheral edge intended to be attached in the frame of the car body exhibits, in a temperature range from −20° to +40° C., and preferably from +5° to +25° C., such a resistance that it is not pierced by the impact of a spherical body of a weight of 20 kg. at an impact velocity of 50 km./hr.;
c. the material forming the median area of the windshield up to the peripheral area intended to be tightened in the frame of the car body is such that the deformation wave resulting from the impact in the central section by a hard spherical body of a weight of 20 kg. reaches the periphery of the windshield in a lapse of time not exceeding 30 msec.

The mode of operation of a windshield having these characteristics is, following the impact of the head against the windshield, as follows:

From the point of impact of the head, there issues a deformation wave which propagates itself without practically any opposition inside the median area of the windshield and reaches its peripheral edge in a lapse of time of 30 msec., at the most. Whether the window has been shattered in its median area or whether it has not yet been destroyed at that instant, owing to its high resistance, at the moment at which the deformation wave reaches the windshield edge the median area is sheared off or detached from the peripheral edge tightened in the car body, under the effect of the energy of the deformation wave. The median area, owing to its required minimal resistance, is not pierced, but detaches itself completely or partly from the frame and from its edge tightened in the frame, without exposing the head to the effect of dangerous deceleration forces after the moment the median area detaches itself. This extraction out of the frame is hereinafter referred to by the term "unlocking."

To achieve the unlocking of the windshield, it is necessary that the power of the impact exceed a minimum value. The latter depends also on the thickness and the resistance characteristics of the sheet of silicate glass peripherally affixed in the car body. According to another feature of the invention, it is possible, through the dimensioning of the sheet of silicate glass in this peripheral area or by modifying its mechanical strength, or by other means described in detail below, to adjust the value of the deflection of the pane, with regard to the power of the impact, above which the unlocking must take place. It is of course understood that, with regard to said deflection, one will not select too low a value, but, on the contrary, a value sufficiently high to provide that the windshield will unlock itself only under impact energies at which serious lesions are to be feared.

Standard untempered silicate glass panes having a thickness from 2 to 8 mm. are sheared off by a deformation wave above energy levels at which said serious lesions are to be feared. According to experimental results, it suffices that one select for the deflection a rather high value so that the unlocking, under the effect of the impact of a body of 5 kg., occur only in the case of impact velocities in excess of 30 km./hr. In practice, this can be achieved by imparting a slight heat treatment to the peripheral area of the sheet of glass attached in the car body in order that its flexural strength in this peripheral area reach a value in the order of 20 kgf./mm.$^2$.

Based on these required characteristics of the invention, it is possible to conceive, according to other aspects of the invention, different systems suitable for the realization of such a windshield.

EXAMPLE 1

A first type of windshield is essentially characterized by the fact that it is constituted by a sheet of silicate glass and a sheet of plastic material cemented to the sheet of glass along side receiving the impact, the sheet of plastic material having smaller dimensions than those of the glass pane so that, at least along the major part of its periphery, the plastic is not held in the frame, the windshield being secured only by the part of the sheet of silicate glass that projects beyond the sheet of plastic material, the sheet of plastic material covering the median area of the windshield being constituted by an unbreakable thermoplastic material which, in the temperature range from −20° to +40° C., has an impact resistance (notched test bar) of at least 5 kgf. cm./cm.$^2$ and a tensile strength according to German industrial standard DIN 53455 (ultimate elongation 0.1 percent) of over 200 kgf./cm.$^2$.

The thickness of the plastic material sheet is selected essentially according to the tensile strength and elongation stress of the material and must not exceed 3 mm., because the impact energies would otherwise reach undesirable levels.

According to a first exemplified embodiment of a windshield of this type, the sheet of silicate glass consists of a sheet of annealed glass, i.e. a glass that is practically free of any stresses, having a thickness between 2 to 8 mm. and preferably between 2.5 and 6 mm. In this mode of realization the unlocking occurs because, under the effect of the deformation wave in the sheet of plastic material, the sheet of silicate glass finds itself cut along its periphery clamped in the car body.

EXAMPLE 2

In another mode of realization the sheet of silicate glass consists of tempered glass of a thickness between 2.5 and 6 mm. In this mode of realization, the unlocking of the sheet of silicate glass at its periphery is promoted by the breaking of the tempered pane and in particular by the energy stored during tempering, which is suddenly released at the moment of the breaking and which determines the fragmentation of the sheet of glass into small pieces up to its periphery, the rate of propagation of this fragmentation reaching 1500 m./sec. Also in this case it is the rate of propagation of the deformation, wave, to achieve the complete unlocking and the progressive acceleration of the entire windshield up to the inherent speed of the head, that takes effect and which is therefore of predominant importance.

The minimum values indicated above with regard to the shearing strength, and the tensile strength of the plastic material, are imperative according to the invention in order that the elevated rates of deformation and the tractive efforts that appear at the moment of the impact be withstood by the sheet of plastic material without causing it to shatter or to deform itself substantially by plasticity. If one respects these limits, one will never have any perforations of the windshield, not even at the maximum impact rates likely to be encountered in practice. In this way, one achieves not only the unlocking, but one avoids any direct contact between the human body and the edges of the glass splinters.

EXAMPLE 3

In the case of a windshield made of a sheet of untempered glass, the sheet of glass may be provided, along the periphery of the sheet of plastic material, with a break line for instance in the form of a marker groove traced into the glass surface in order to facilitate the shearing process in this area.

EXAMPLE 4

A second type of windshield complying with the invention is essentially characterized by the fact that the windshield is made up of two elementary sheets of silicate glass joined to one another by means of a plastic layer interpolated therebetween; the one of the two sheets of glass affixed in the car body being tightened in the frame along its entire periphery and the second sheet of glass covering the median part of the windshield, as well as the interpolated plastic layer, are of smaller dimensions than the first sheet of glass and are therefore not tightened in the frame, terminating preferably along their entire periphery ahead of the frame.

It was found that the rate or propagation of the wave of deformation in the laminated glass-butyral-glass element satisfies the requirements set forth above if the sheet of glass affixed in the frame has a thickness between 2 and 8 mm. and if the sheet of glass that is not being gripped by the frame has a thickness between 0.1 and 3 mm. This is likewise the case if the butyral sheet has a thickness of at least 0.7 mm.

The resistance to perforation and the rate of the wave of deformation that are required can be achieved through selection of the constituent material of the interpolated layer and/or its thickness. Thus, for instance, if the interior (the smaller) sheet of silicate glass is selected at standard resistance, the interpolated layer is determining in providing the resistance to perforation. If, in such a mode of realization, butyral polyvinyl is selected as the interpolated layer, the latter must have a thickness of at least 0.7 mm.

EXAMPLE 5

According to another mode of realization, the outer sheet, affixed in the frame, may be of annealed, i.e., untempered glass, and the second sheet which receives the impact and which is not clamped in the frame can be made of a glass having a high flexural strength achieved by thermal or chemical tempering.

In this mode of realization, the function of conferring upon the windshield the required perforation resistance is assumed, on the one hand, by the sheet of glass tempered to high flexural strength. The flexural strength of this sheet of glass must be sufficiently high to enable it to withstand without shattering the local deformation caused by the impact of the head at impact velocities that are not too high. In this case the risk of injuries as a result of cuts is practically eliminated.

In this mode of realization, the interpolated layer of cement does not necessarily require, as in the first case, great resistance to perforation. Depending on the flexural strength achieved in the interior sheet of glass it may even be necessary to use, as the intermediate layer, a particularly hard and brittle cement in order to increase the rate of propagation of the wave of deformation and to achieve that the inside sheet of glass will not shatter before the windshield has been unlocked. Depending on the mechanical properties of the cement layer it may, in certain cases, even be tightened in the frame. This holds true in cases in which the cement allows practically no plastic deformation likely to result in an extension of the impact duration, but is, on the contrary, sheared along the frame by the interior sheet of glass, without any noticeable overload as far as the head is concerned.

In any event, the requirements of this mode of the invention are satisfied in the case of a windshield in which the sheet of glass gripped in the car body consists of tempered glass.

With regard to this second type of windshield, it is particularly advantageous to select a thickness below 1.5 mm. for the inside (the smaller) sheet of glass. Indeed, in this case, the risk that the interpolated plastic layer will be damaged by the glass splinter edges at the moment of the breaking of the inside sheet of glass is small because the excessively thin sheet of glass will fold, owing to its great flexibility, over the edges of the splinters thereby greatly reducing the shearing effect that is dangerous with regard to the interpolated plastic layer.

EXAMPLE 6

Finally, the two sheets of glass can consist of a glass having an elevated flexural strength, provided the peripheral area tightened in the frame has a rather low flexural strength in order that unlocking occur in the event of an impact.

According to another preferred mode of realization of the invention, the frame supporting the windshield or the rubber seal may overlap along the inside of the windshield toward the median area of the latter, in order to cover the peripheral area of lower flexural strength. One can thus have the certainty that, even after the breaking of the peripheral zone, the sheet is held along the inside, thereby preventing any collapsing of the windshield into the inside of the vehicle in the case of an impact coming from the outside. It is understood that, with regard to this mode of realization, one must see to it that there should not be any adhesion between this portion of the car body, or of the rubber section constituting an abutment, and the portion presenting a high resistance to the flexing of the sheet of glass so that one can in any event be certain that the median area of the windshield will be readily unlocked from its frame under the effect of an impact from the inside toward the outside.

The test that follows describes different exemplified embodiments of a windshield according to the invention, as well as the mode of operation of the novel windshield with reference to a few force/time diagrams.

Figures 1, 2, 3, 4:
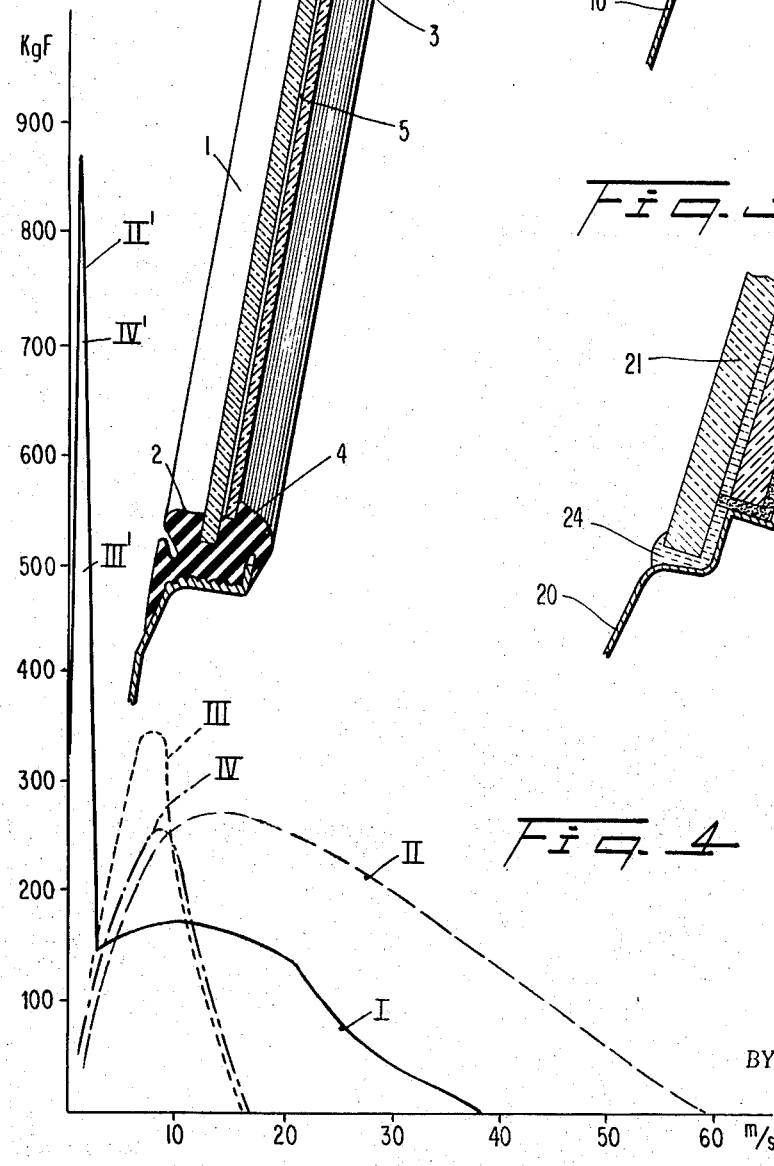
FIG. 1 shows in section the structure of a windshield, in accordance with the invention, constituted by a laminated sheet.
FIG. 2 represents in section a preferred mode of construction of the frame using a rubber section
FIG. 3 represents in section another construction of the frame in the case of a fastening of the windshield by cementing directly onto the car body.
FIG. 4 is a force/time diagram obtained on the basis of the measurements performed on different types of windshields by subjecting different types of windshields to impact tests.

As can be seen on FIG. 1, the side of the novel windshield not receiving the impact directly, i.e., the outer side, consists of a sheet of silicate glass 1 held along its periphery in the frame 2. Along the side receiving the impact there is a smaller sheet 3. The latter terminates preferably, along its entire periphery, within the frame in which the sheet of silicate glass 1 has been fixed so that, contrary to the latter, it is not held tightly in the frame. In accordance with a first mode of realization, this smaller sheet 3 is made of plastic.

The sheet of silicate glass 1 is joined to the plastic material sheet 3 by means of a spacer layer 5 made of a suitable cement. This cement layer is preferably selected in such a way that it will, within the temperature range referred to above, absorb the mechanical tension stresses generated as a result of the difference of thermal expansion between the glass and the plastic material.

Considering the minimum value, required according to the invention, of the mechanical properties of the substance making up the plastic material sheet 3, this substance can be chosen from among the known plastic materials. Thus, for instance, the required conditions are satisfied in the case of an ethylene glycol polyterephtalic ester sheet of a thickness of 0.25 mm., a high-molecular-weight thermoplastic polycarbonate sheet of a dihydroxylated aromatic compound, in particular diphenynolalkane, of a thickness of 1 mm., an amorphous polyamide sheet of bifunctional aromatic acids, in particular terephtalic acid and an alkyl substituted bifunctional aliphatic amine, in particular diamine hexamethylene, of a thickness of 0.25 mm. or even a polyvinyl chloride sheet free of plasticizer, of a thickness of 0.5 mm.

The sheet 3, of smaller size, can likewise be of silicate glass, provided one sees to it that the interpolated plastic layer 5 and the sheet of silicate glass 3, or the laminated unit made up of the elementary sheets 1, 3, and 5, is endowed in its median zone with the strength required for perforation. The sheet of glass 1 has a thickness of 2 to 8 mm. and the sheet of glass 3 has a thickness of 0.1 to 3 mm. The interpolated plastic layer consists of polyvinyl butyral and has a thickness of at least 0.7 mm.

FIG. 2 represents another mode of realization of the frame in which the smaller size sheet 3 is firmly supported in order to prevent a collapse of the windshield toward the inside of the vehicle in the event of the breaking of the outer sheet of glass 1 under the effect of an impact coming from outside. To this end, the part 10 of the car body constituting the frame of the windshield is extended in order that the upper part 11 of its frame overlap over the periphery of the sheet 3. The rubber section 12 has, in this area, been widened by the lip 13 which applies against the sheet 3. In this case, of course, care must be exercised in order that there should not be any adhesion between the periphery of the sheet 3 and the lip 13 of the rubber section so that, in the event of an accident, the sheet 3 can easily liberate itself from the rubber section, and move outward.

If the use of a rubber section is dispensed with, the frame can suitably be executed on the car body, as shown in FIG. 3. In this case, the rabbet of the frame 20 is bent twice in stepwise fashion so that the outer sheet of glass 21 and the inner sheet of glass 23 are hemmed in by the steps formed in this manner. The outer sheet 21 is fixedly attached to the car body 20 along its entire periphery by means of a suitable cement 24. The inner sheet 23, on the contrary, must not be connected to the car body in any way. To this end, one can interpose between the periphery of the sheet 23 and the corresponding part 25 of the frame a suitable separating means 26.

FIG. 4 shows a series of curves indicating the value of the force as a variable of the time; these curves prove the substantial reduction of the impact duration achieved by means of the novel windshields. The device chosen to perform the tests consists of an artificial head of an overall weight of 20 kg. The head comprises the body of impact properly speaking, that is to say, a wooden head of a diameter of 19 cm., and a weight of 14 kg. affixed behind said head. This weight of 14 kg. represents the mass of the body taking part in the impact and it was selected at that value because one may take for granted that, in extreme cases, a proportion of approximately 20 to 25 percent of the mass of the body transmits its kinetic energy to the head via the cervical vertebrae. Between the wooden head and the weight, that is to say, at the point corresponding to the area of the cervical vertebrae, there is installed a cell for measuring the forces that are generated. This cell weighs, in itself, 1 kg. so that the overall weight of the impact body corresponds to 20 kg.

Depending on the desired impact velocities, this artificial head is allowed to drop from different heights onto a test glass pane of a size of 50 + 100 cm. The test glass panes are attached under different conditions at their periphery and especially, in one case, by the application of a frame having a weight of 56 kg., which corresponds to a fixation force of 120 g./cm.$^2$, and, in another case, by means of screwing on of the frame, which corresponds to an absolute fixation such as that achieved for instance by the cementing of the windshield on the car body.

In the case of such a rigid impact body, one can note, with one and the same impact velocity and one and the same mass participating in the impact, a higher impact force and a shorter total i.e., a shorter total impact duration, i.e., a shorter total impact duration than in the case of an anatomic unit similar to those used for medical research. The reason can be found in the difference in behavior of the mass of the impact regarding which, in the case of a rigid body, the mass as a whole participates to a certain extent in the impact right from the beginning, whereas, in the case of the impact of the human body, as a result of its deformability, the mass of the body participates in the impact only more or less gradually.

In spite of this difference, the essential advantage of the novel panes can be clearly proven by the results of the measurements made with the artificial head described above.

All tests were performed at an impact velocity of 22.5 km./hr., with the exception of test I in which the impact velocity was 19.7 km./hr. In this case it had been necessary to lower the velocity, for, in the case of higher velocities the sheet of glass was destroyed, which would have prevented making any comparisons. The fixation conditions were kept constant for all tests, that is to say, the force of fixation was 120 g./cm.$^2$.

The curves represent the impact behavior of the following different windshields:

CURVE I

Standard laminated windshield made of two elementary sheets of glass of a thickness of 3.1 mm. each and one interpolated layer of butyral polyvinyl of a thickness of 0.38 mm.

CURVE II

Laminated windshield as above having however an interpolated layer of butyral polyvinyl of a thickness of 0.76 mm.

CURVE III

Windshield designed according to the instant invention and made of a normally annealed sheet of silicate glass of a thickness of 4.2 mm. and of a polyester sheet having a thickness of 0.25 mm.

CURVE IV

Windshield likewise designed according to the invention, made of a sheet of thermally tempered silicate glass of a thickness of 4.2 mm. and of a polyester sheet of a thickness of 0.25 mm.

The shape of all curves is, roughly speaking, the same. This shape is characterized by two impact phases, i.e., a high point of force for a duration of approximately 1 millisecond following the onset of the impact and a second phase which, by comparison with the first impact peak, extends over a considerably longer duration. With regard to the first impact phase the peak of which represents the force required for the breaking of the silicate glass, without taking into consideration its flexural strength, it is mainly the thickness of the windshield that is the determining factor. Lest this peak force reach a dangerous level, the thickness of the elementary sheets must not exceed the maximum values referred to above.

For purposes of greater clarity of the diagram it is only in the case of the curve I that the shape of the curve in the area of the peak of the force has been shown, whereas, with regard to the other curves, the maximum levels of the force peaks have been indicated merely by the points II', III', and IV'.

The moment the silicate glass has been broken, the impact force falls off very rapidly. Even though the first peak of force is relatively high, it is not a hazard factor regarding internal injuries, for its duration of action is excessively short.

It is, on the contrary, the second phase of the impact that is dangerous, and it is precisely the object of the invention to shorten this phase of the impact or to achieve even a shortening of the impact process as a whole. This second part of the curve is now established essentially by the material used in each case to constitute the median area, or, more exactly, by the behavior of this material with regard to the plasticity and the propagation of the deformation wave.

The curve I does not have to be taken into consideration, for such a windshield will cave in at an impact velocity of the artificial head of 20 to 25 km./hr., and may result in the dangerous phenomenon of the formation of the "collar." Nevertheless, even in the case of these low impact velocities, the total duration of the impact lasts 38 milliseconds. This total duration rises in the case of the curve II up to 60 milliseconds and simultaneously the effective force, that is to say the average force acting during the laps of time corresponding to the second part of the curve, passes from 120 to 190 kg.

By comparison with the curve II (relating to a laminated glass windshield comprising an interpolated "high impact" sheet), the curves III and IV (relating to windshields according to the invention) show that the overall duration of the impact is lowered considerably owing to the invention: in these two cases, this duration reaches only approximately 16 milliseconds. The peak of force has not been influenced very substantially, but macroscopic injuries of the cervical vertebrae are now excluded, owing to the very short periods of impact duration that have been achieved.

A very large number of impact tests performed on the windshields manufactured according to the different modes of realization of the invention lead, qualitatively, to identical results, that is to say that, in all cases, there was noted a considerable reduction of the impact duration by comparison with the laminated glass windshields known in the art, so that it is not necessary to indicate here the precise numerical findings of these tests.

We claim:

1. A laminated windshield for automotive vehicles, comprising, an outer glass sheet having a thickness between about 2.5 and 6.0 mm., an inner sheet of transparent material and of smaller size than said outer sheet, said sheets being secured together in surface-to-surface relation by a thermoplastic interlayer, to leave a border portion of said outer sheet extending beyond the periphery of said inner sheet and interlayer, said border portion being adapted for securement in a mounting frame, at least said border portion of said outer sheet being essentially untempered.

2. The windshield of claim 1, said outer sheet being essentially untempered over its entire area.

3. The windshield of claim 1, material of said outer sheet being removed along a line in said border portion, contiguous to the periphery of said inner sheet, to thereby form a circumscribing weakening of said outer sheet, along said line.

4. The windshield of claim 1, said inner sheet being of thermoplastic material.

5. The windshield of claim 1, said inner sheet being of essentially untempered glass.

6. The windshield of claim 1, said inner sheet being of glass strengthened by ion exchange.

* * * * *

UNITED STATES PATENT OFFICE
CERTIFICATE OF CORRECTION

Patent No. 3,630,812  Dated December 28, 1971

Inventor(s) Fritz Bruckner, et al.

It is certified that error appears in the above-identified patent and that said Letters Patent are hereby corrected as shown below:

On the Title Page, at line "[32]" add --, May 3, 1968, July 15, 1968 --; at line "[31]" add --, P 17 55 395.6, P 17 55 955.6 --.

Signed and sealed this 26th day of September 1972.

(SEAL)
Attest:

EDWARD M. FLETCHER, JR.
Attesting Officer

ROBERT GOTTSCHALK
Commissioner of Patents